(12) United States Patent
Tanimura et al.

(10) Patent No.: US 8,942,569 B2
(45) Date of Patent: Jan. 27, 2015

(54) OPTICAL TRANSMISSION/RECEPTION SYSTEM, OPTICAL TRANSMITTER, OPTICAL RECEIVER, AND OPTICAL TRANSMISSION/RECEPTION METHOD

(75) Inventors: Takahito Tanimura, Kawasaki (JP); Takeshi Hoshida, Kawasaki (JP); Hisao Nakashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 809 days.

(21) Appl. No.: 12/581,413

(22) Filed: Oct. 19, 2009

(65) Prior Publication Data
US 2010/0111531 A1 May 6, 2010

(30) Foreign Application Priority Data

Oct. 30, 2008 (JP) ................................. 2008-279875

(51) Int. Cl.
| | |
|---|---|
| *H04B 10/00* | (2013.01) |
| *H04J 14/06* | (2006.01) |
| *H04B 10/54* | (2013.01) |
| *H04B 10/50* | (2013.01) |

(Continued)

(52) U.S. Cl.
CPC .......... *H04B 10/541* (2013.01); *H04B 10/5055* (2013.01); *H04B 10/532* (2013.01); *H04B 10/60* (2013.01); *H04B 2210/254* (2013.01)
USPC .............. 398/152; 398/65; 398/184; 398/205

(58) Field of Classification Search
USPC ..................... 398/65, 152, 184, 205
See application file for complete search history.

(56) References Cited

U.S. PATENT DOCUMENTS

| | | | | |
|---|---|---|---|---|
| 3,752,992 A | * | 8/1973 | Fluhr .............................. | 398/65 |
| 5,111,322 A | * | 5/1992 | Bergano et al. .................. | 398/74 |
| 5,841,557 A | * | 11/1998 | Otsuka et al. ................... | 398/65 |

(Continued)

FOREIGN PATENT DOCUMENTS

WO WO 2004/032386 4/2004

OTHER PUBLICATIONS

Polarization. (1998). In Dictionary of Communications Technology: Terms, Definitions and Abbreviations, Wiley. Retrieved from http://www.credoreference.com/entry/wileycommtech/polarization.*

(Continued)

*Primary Examiner* — David Payne
*Assistant Examiner* — Tanya Motsinger
(74) *Attorney, Agent, or Firm* — Staas & Halsey LLP (57) ABSTRACT

An optical transmission/reception system includes a modulator for modulating light based on data to output signal light; a transmission-side signal processor performing transmission-side digital signal processing which imparts a polarization change to the signal light by the optical modulation with respect to an input signal; an optical transmitter in which the modulator performs the optical modulation based on the input signal subjected to the transmission-side digital signal processing in the transmission-side signal processor; and an optical receiver including a converter converting the signal light inputted from the optical transmitter via a transmission path to a digital electric signal for each polarization component, and a reception-side signal processor performing reception-side digital signal processing which imparts a polarization change having a property substantially inverse to a property of the polarization change in the transmission-side signal processor with respect to the digital electric signal from the converter.

12 Claims, 7 Drawing Sheets

(51) Int. Cl.
*H04B 10/532* (2013.01)
*H04B 10/60* (2013.01)

(56) References Cited

U.S. PATENT DOCUMENTS

| | | | |
|---|---|---|---|
| 6,310,709 B1* | 10/2001 | Bergano | 398/185 |
| 6,359,712 B1* | 3/2002 | Kamitani | 398/41 |
| 6,437,892 B1* | 8/2002 | Fang et al. | 398/152 |
| 6,538,786 B1* | 3/2003 | Naito | 398/152 |
| 6,580,535 B1* | 6/2003 | Schonfelder | 398/65 |
| 6,650,846 B1* | 11/2003 | Ito | 398/184 |
| 7,280,764 B2* | 10/2007 | Nishimura et al. | 398/152 |
| 7,292,793 B2* | 11/2007 | Bergano | 398/183 |
| 7,486,897 B2* | 2/2009 | Kim et al. | 398/183 |
| 7,620,326 B2* | 11/2009 | Glingener | 398/152 |
| 8,032,025 B2* | 10/2011 | Ibragimov et al. | 398/65 |
| 8,428,468 B2* | 4/2013 | Yoshihara | 398/152 |
| 8,805,188 B2* | 8/2014 | Kikuchi | 398/65 |
| 2002/0067883 A1* | 6/2002 | Lo | 385/24 |
| 2003/0103771 A1* | 6/2003 | Atmur et al. | 398/152 |
| 2003/0217306 A1* | 11/2003 | Harthcock et al. | 714/30 |
| 2004/0197103 A1 | 10/2004 | Roberts et al. | |
| 2004/0264592 A1* | 12/2004 | Sibecas et al. | 375/267 |
| 2005/0226633 A1 | 10/2005 | Liu | |
| 2005/0265727 A1* | 12/2005 | Glingener | 398/152 |
| 2006/0127104 A1 | 6/2006 | Harley et al. | |
| 2006/0228116 A1* | 10/2006 | Bontu et al. | 398/152 |
| 2006/0269293 A1* | 11/2006 | Sunaga et al. | 398/152 |
| 2007/0019201 A1* | 1/2007 | Waagaard et al. | 356/478 |
| 2007/0140703 A1 | 6/2007 | Fells | |
| 2008/0095121 A1* | 4/2008 | Shattil | 370/335 |
| 2008/0170862 A1* | 7/2008 | Vassilieva et al. | 398/152 |
| 2008/0172593 A1* | 7/2008 | Rainish et al. | 714/776 |
| 2008/0232816 A1* | 9/2008 | Hoshida et al. | 398/152 |
| 2009/0060508 A1* | 3/2009 | Tanimura et al. | 398/65 |
| 2009/0110033 A1* | 4/2009 | Shattil | 375/141 |
| 2009/0257755 A1* | 10/2009 | Buelow | 398/184 |
| 2010/0008677 A1* | 1/2010 | Conroy et al. | 398/154 |
| 2010/0080569 A1* | 4/2010 | Xu et al. | 398/152 |
| 2010/0111531 A1* | 5/2010 | Tanimura et al. | 398/65 |
| 2010/0166423 A1* | 7/2010 | Chang et al. | 398/65 |
| 2011/0150479 A1* | 6/2011 | Kim et al. | 398/65 |
| 2011/0268456 A1* | 11/2011 | Nakamoto | 398/152 |

OTHER PUBLICATIONS

T.Pfau et al., "PDL-Tolerant Real-time Polarization-Multiplexed QPSK Transmission with Digital Coherent Polarization Diversity Receiver," LEOS Summer Topical Meetings, 2007 Digest of the IEEE, 2007, pp. 17-18.*

T.Pfau et al., "PDL-Tolerant Real-time Polarization-Multiplexed QPSK Transmission with Digital Coherent Polarization Diversity Receiver," LEOS Summer Topical Meetings. 2007 Digest of the IEEE, 2007, pp. 17-18.

T.Pfau et al., "Ultra-Fast Adaptive Digital Polarization Control in a Realtime Coherent Polarization-Multiplexed QPSK Receiver," OTuM3 OFC/NFOEC 2008 (San Diego, 2008), 3 pp.

European search Report issued Feb. 22, 2010 for related European Patent Application No. 09173614.0-2415.

* cited by examiner

OPTICAL TRANSMISSION/RECEPTION SYSTEM, OPTICAL TRANSMITTER, OPTICAL RECEIVER, AND OPTICAL TRANSMISSION/RECEPTION METHOD

CROSS-REFERENCE TO RELATED APPLICATIONS

This application is based upon and claims the benefit of priority of the prior Japanese Patent Application No. 2008-279875, filed on Oct. 30, 2008, the entire contents of which are incorporated herein by reference.

BACKGROUND

1. Field

The present invention relates to an optical transmission/reception system, an optical transmitter, an optical receiver, and an optical transmission/reception method. The present invention is applied to, e.g., a polarization multiplexing optical communication system which performs modulation with an independent signal sequence for each polarization component.

2. Description of the Related Art

In recent years, attention has been focused on polarization multiplexing communication capable of multiplying bit rate per baud in an optical communication system. Utilization of adaptive polarization separation signal processing is favorable for the separation of a polarization multiplexed signal. In adaptive polarization separation signal processing, digital signal processing is applied to an analog/digital conversion technology and a digital coherent technology. The adaptive polarization separation signal processing adaptively estimates polarization properties of a transmission path and demodulates the polarization multiplexed signal.

It is to be noted that the polarization properties on the transmission path in the optical communication system fluctuate with time and cause degradation in communication quality. Examples of the properties which fluctuate with time include a status of polarization (SOP), polarization-mode-dispersion (PMD), a polarization-dependent-loss (PDL), and a polarization-dependent-gain (PDG). These polarization-property fluctuations lower performance of the polarization multiplexing communication system.

It is known that the degradation caused by polarization dependence such as the PMD, the PDL, and the PDG may be reduced by scrambling the polarization. In a DWDM (Dense Wavelength Division Multiplexing) system, it is possible to mount a module which collectively performs optical polarization scrambling with respect to DWDM signal light in a relay node after the DWDM. As a result, there are cases where this arrangement achieves advantages in terms of reductions in cost, device size, and power consumption, etc. when compared with the case in which an optical polarization scrambler is individually mounted in each of optical transmitters.

In addition, in recent years, in order to cope with waveform distortion on a transmission path, it is proposed to reduce the signal degradation caused by a linear effect, a non-linear effect, and a polarization-dependent effect on the transmission path by performing signal processing on the transmission side of the optical communication system to preliminarily convert (pre-equalize) a transmission signal.

[Non-Patent Document 1] T. Pfau et al., "PDL-Tolerant Real-time Polarization-Multiplexed QPSK Transmission with Digital Coherent Polarization Diversity Receiver", LEOS Summer Topical Meetings, 2007 Digest of the IEEE, 2007

[Non-Patent Document 2] T. Pfau, et al., "Ultra-Fast Adaptive Digital Polarization Control in a Realtime Coherent Polarization-Multiplexed QPSK Receiver", OTuM3 OFC 2008 (San Diego, 2008)

[Patent Document 1] US Patent Application publication Number 2005/0226633 Specification

[Patent Document 2] US Patent Application publication Number 2006/0127104 Specification In the above-described technology which collectively performs the optical region polarization scrambling with respect to the DWDM signal in the relay node, since the polarization scrambling is collectively performed for all channels, there are cases where a channel in which a penalty is increased by the polarization scrambling is included depending on a modulation method. Consequently, it is preferable to be able to appropriately determine whether or not the polarization scrambling is to be performed in accordance with each of the channels. However, a device performing the polarization scrambling in the optical region is burdensome in terms of the device size and cost, and it is therefore difficult to introduce the device in each of the channels.

In the technology (pre-equalization technology) which preliminarily converts the waveform of a transmission signal on the transmission side in the optical communication system, it is not possible to suppress the influence exerted by the PMD, the PDL, and the PDG on the transmission path which constantly fluctuate. Consequently, it is desired to be able to suppress the influence on reception signal quality exerted by the constantly fluctuating transmission path properties and maintain excellent reception signal quality.

In the adaptive polarization separation signal processing to which the conventional digital signal processing is applied, it has been possible to respond to and adaptively compensate for slow polarization state fluctuations. However, it is not easy to respond to the polarization property having high fluctuation speed such as, e.g., the polarization property fluctuating at intervals of not more than 1 millisecond, using the adaptive polarization separation signal processing. This means that it becomes difficult to perform the adaptive polarization separation signal processing on the reception side when high-speed polarization scrambling is performed in order to suppress the influence by the polarization properties which fluctuate with time.

SUMMARY

According to an aspect of the invention, an optical transmission/reception system includes a modulator for modulating light based on data to output signal light; a transmission-side signal processor performing transmission-side digital signal processing which imparts a polarization change to the signal light by the optical modulation with respect to an input signal; an optical transmitter in which the modulator performs the optical modulation based on the input signal subjected to the transmission-side digital signal processing in the transmission-side signal processor; and an optical receiver including a converter converting the signal light inputted from the optical transmitter via a transmission path to a digital electric signal for each polarization component, and a reception-side signal processor performing reception-side digital signal processing which imparts a polarization change having a property substantially inverse to a property of the polarization change in the transmission-side signal processor with respect to the digital electric signal from the converter.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

The above-described embodiments of the present invention are intended as examples, and all embodiments of the present invention are not limited to including the features described above.

DETAILED DESCRIPTION OF THE PREFERRED EMBODIMENTS

Reference may now be made in detail to embodiments of the present invention, examples of which are illustrated in the accompanying drawings, wherein like reference numerals refer to like elements throughout.

An embodiment will be described hereinbelow with reference to the drawings. It is to be noted that the embodiment described below is essentially only illustrative, and by no means intended to exclude the application of various modifications and techniques which are not explicitly shown below. That is, the present embodiment may be variously modified and carried out without departing from the gist thereof.

[A] Description of an Embodiment

Figure 1:
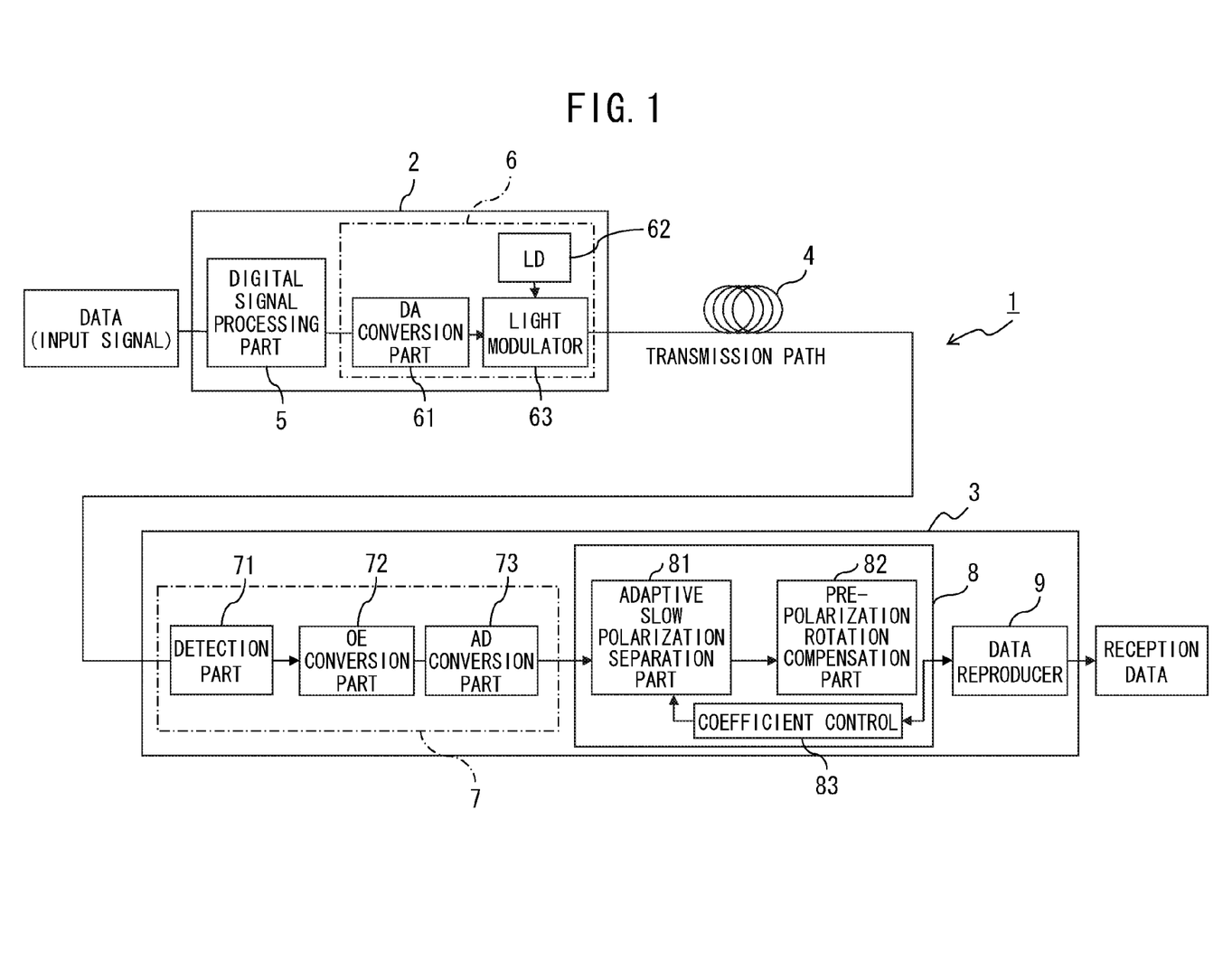
FIG. 1 is a view illustrating an optical transmission/reception system of an embodiment.

FIG. 1 is a view illustrating an optical transmission/reception system 1 of the embodiment. In FIG. 1, as an example, to the optical transmission/reception system 1, an optical transmitter 2 and an optical receiver 3 are coupled via a transmission path 4. The optical transmitter 2 includes a digital signal processing part 5 and a modulation part 6.

In the optical transmitter 2, the modulation part 6 performs optical modulation to output signal light. The digital signal processing part (transmission-side digital signal processing part) 5 is an example of a transmission-side signal processing part. The digital signal processing part performs digital signal processing which imparts a polarization change to the signal light. The polarization change is imparted to the signal light after the modulation with respect to an input signal and, for example, a digital signal processor (DSP), a field programmable gate array (FPGA), and an application specific integrated circuit (ASIC) may be applied. Specifically, the digital signal processing is performed with respect to data serving as a source of respective drive signals for two polarization components orthogonal to each other. The two polarization components are modulation targets in the modulation part 6 in a subsequent stage so that the signal light modulated in the modulation part 6 becomes light subjected to polarization scrambling. The two polarization components described above may be substantially orthogonal to each other. That is, in the optical transmission/reception system of the present invention, a certain degree of error is permitted even when they are not orthogonal to each other as long as reception sensitivity in the optical receiver is not affected. In this specification, two polarization components orthogonal to each other or substantially orthogonal to each other are referred to as "orthogonal polarization components".

That is, the modulation part 6 performs the above-described optical modulation on the basis of the input signals (data items Ex and Ey used for the optical modulation for the two polarization components) subjected to the digital signal processing in the digital signal processing part 5 as one example of the transmission-side signal processing part. Specifically, the optical modulation is performed with respect to the corresponding polarization components in light from a light source 62 on the basis of the data items for modulation Ex and Ey from the above-mentioned digital signal processing part 5. As an example, the polarization component corresponding to the data item Ex may be assumed to be an x polarization component and the polarization component corresponding to the data item Ey may be assumed to be a y polarization component.

In the digital signal processing part 5, signal conversion equivalently using matrix R as indicated in an expression (1) is performed with respect to the input signals (Ex 0, Ey 0) as the data items for two polarization components orthogonal to each other. The digital signal processing part 5 may output the result of the signal conversion by the expression (1) (Ex 1, Ey 1) to the modulation part 6. Since the input signals for modulation are converted from (Ex 0, Ey 0) to (Ex 1, Ey 1) in the digital signal processing part 5, for the signal light obtained as the result of modulation in the modulation part 6, it can be said that transmission electric fields of the signal light are converted.

For example, the transmission electric fields for respective polarization components of the signal light after the modulation correspond to Ex 0 and Ey 0 as the input signals when polarization control processing in the digital signal processing part 5 is not performed. In contrast to this, the transmission electric fields for the respective polarization components of the signal light may be converted to values corresponding to Ex 1 and Ey 1 by performing the digital signal processing equivalent to the operation of the expression (1) using the matrix R.

As indicated in an expression (2), the matrix R may rotate (scramble) the values of the input signals (corresponding to the value of the transmission electric field for each of the polarization components) at an angular velocity $\omega T$ using a multiplication.

[Expression 1]

$$\begin{pmatrix} Ex1 \\ Ey1 \end{pmatrix} = R \begin{pmatrix} Ex0 \\ Ey0 \end{pmatrix} \quad (1)$$

$$R(\omega) \equiv \begin{pmatrix} \cos\omega_T t & -\sin\omega_T t \\ \sin\omega_T t & \cos\omega_T t \end{pmatrix} \quad (2)$$

The modulation part 6 includes a digital/analog (DA) conversion part 61, the light source 62, and a light modulator 63. The DA conversion part 61 converts the data items Ex and Ey (digital signals) for the respective polarization components from the digital signal processing part 5 to analog signals. As the light source 62, a laser diode (LD) may be applied as an example. The light modulator 63 performs the optical modulation in correspondence to x-axis and y-axis polarization components with respect to the light from the light source 62 on the basis of the signals from the DA conversion part 61.

With this operation, in the light modulator 63, the light from the LD 62 is modulated using the drive signals corresponding to the values (Ex 1, Ey 1) obtained by rotating the input signals (Ex 0, Ey 0) by the digital signal processing in the digital signal processing part 5. That is, it is possible to modulate the x-axis polarization component and the y-axis polarization component of the light from the LD 62 using the drive signals corresponding to the data items Ex 1 and Ey 1 obtained by the above-mentioned expression (1). The thus modulated signal light is transmitted through the transmission path 4.

In other words, in the signal light modulated using the drive signals corresponding to the data items Ex 1 and Ey 1, the polarization state thereof is scrambled in comparison with the case where the input signals Ex 0 and Ey 0 are modulated in the light modulator 63. In this manner, the polarization scrambling of the signal light to be transmitted is implemented through the digital signal processing in the digital signal processing part 5.

Figure 2:
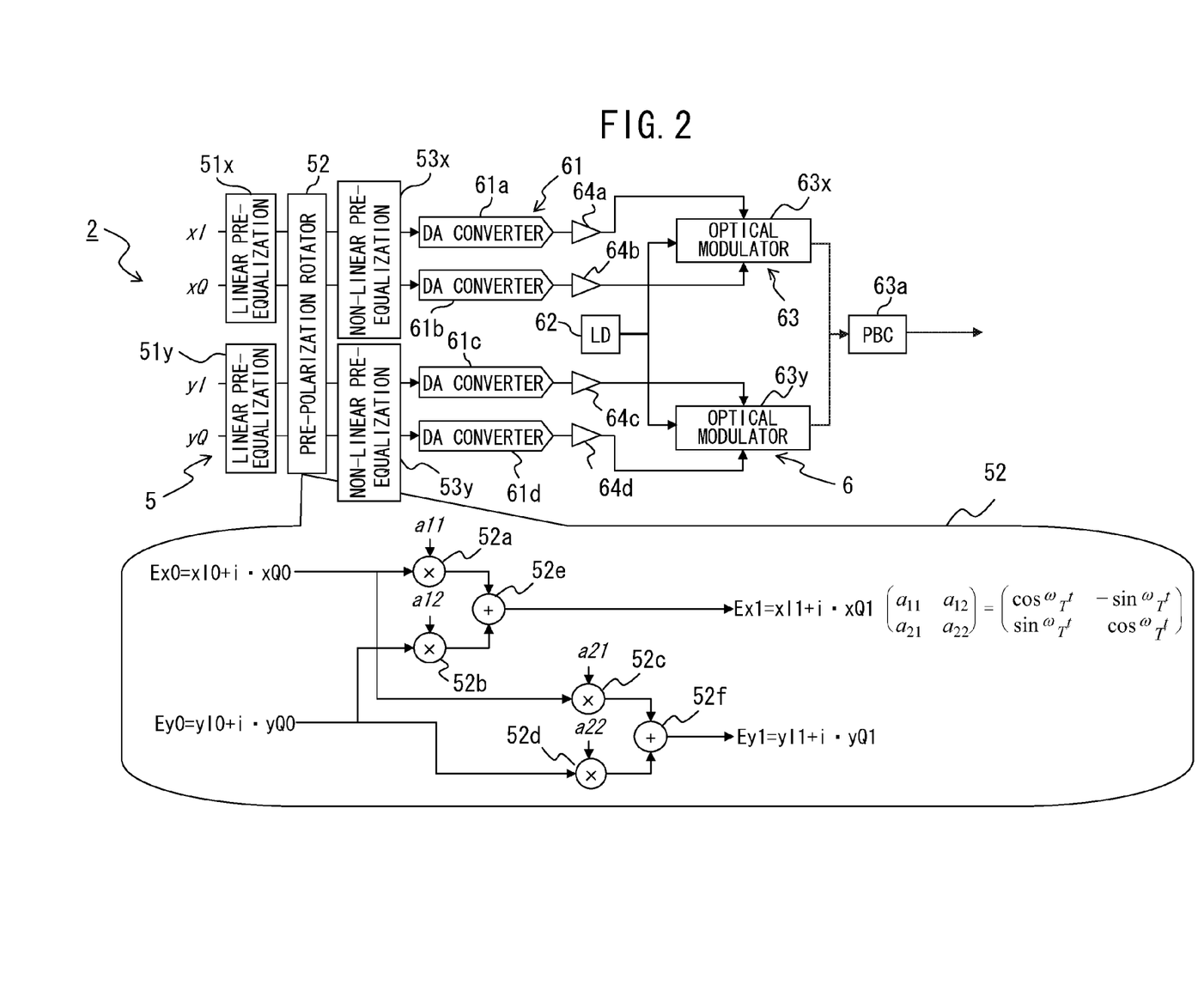
FIG. 2 is a view illustrating an example of an optical transmitter.

FIG. 2 is a view illustrating an example of the optical transmitter 2 described above. As the optical transmitter 2 illustrated in FIG. 2, it is possible to perform phase modulation with respect to the orthogonal polarization components (x polarization and y polarization in this case) for an I (In-phase) component and a Q (Quadrature-phase) component. As the method for modulation to the respective polarization components, various modulation methods may be applied. In addition, it is possible to perform the modulation to the two polarization components using the same data sequence. However, when the modulation is performed using data sequences independent of each other, it is possible to multiply the bit rate per baud by allowing the polarization multiplexing communication.

The digital signal processing part 5 illustrated in FIG. 2 includes a pre-polarization rotation part (pre-polarization rotator) 52 performing the polarization scrambling (polarization rotation) indicated in the above-mentioned expression (1). The digital signal processing part 5 may also include, e.g., linear pre-equalization parts 51x and 51y, and non-linear pre-equalization parts 53x and 53y.

The linear pre-equalization part 51x performs pre-equalization in accordance with linear properties of the transmission path 4 with respect to an input signal Ex having the I component and the Q component respectively represented as xI and xQ. The linear pre-equalization part 51x outputs the result to the pre-polarization rotation part 52. Similarly, the linear pre-equalization part 51y performs the pre-equalization in accordance with the linear properties of the transmission path 4 with respect to an input signal Ey having the I (In-phase) component and the Q (Quadrature-phase) component respectively represented as yI and yQ. The linear pre-equalization part 51y outputs the result to the pre-polarization rotation part 52.

In addition, the non-linear pre-equalization part 53x performs the pre-equalization in accordance with non-linear properties of the transmission path 4 with respect to a transmission electric field signal Ex (=xI+i·xQ) obtained as the result of the above-mentioned polarization scrambling performed in the pre-polarization rotation part 52. Similarly, the non-linear pre-equalization part 53y performs the pre-equalization in accordance with the non-linear properties of the transmission path 4 with respect to the transmission electric field signal Ey (=yI+i·yQ) obtained as the result of the above-mentioned polarization scrambling performed in the pre-polarization rotation part 52. The i mentioned herein means an imaginary unit.

With regard to the amount of the pre-equalization processing performed in each of the above-mentioned linear pre-equalization parts 51x and 51y, the linear properties of the transmission path 4 are preliminarily measured and the amount may be determined in accordance with the measurement result. Similarly, the amount of the pre-equalization processing performed in each of the non-linear pre-equalization parts 53x and 53y may also be determined in accordance to the preliminarily measured non-linear properties of the transmission path 4. It is to be noted that the technology described in the above-mentioned Patent Document 2 may also be applied to the above-mentioned linear pre-equalization parts 51x and 51y and the above-mentioned non-linear pre-equalization parts 53x and 53y.

The pre-polarization rotation part 52 performing the pre-polarization rotation processing indicated in the above-described expression (1) may include complex multipliers 52a to 52d and complex adders 52e and 52f as illustrated in FIG. 2. The complex multipliers 52a and 52c respectively multiply the input signal Ex 0 (=xI 0+i·xQ 0) by a11=cos ωT and a21=sin ωT. Similarly, the complex multipliers 52b and 52d respectively multiply the input signal Ey 0 (=yI 0+i·yQ 0) by a12=−sin ωT and a22=cos ωT.

The complex adder 52e adds the multiplication results in the complex multipliers 52a and 52b, and outputs the result of the addition as the data item subjected to the pre-polarization rotation Ex 1 (=xI 1+i·xQ 1). The complex adder 52f adds the multiplication results in the complex multipliers 52c and 52d, and outputs the result of the addition as the data item subjected to the pre-polarization rotation Ey 1 (=yI 1+i·yQ 1). With this operation, it is possible to obtain the data items Ex 1 and Ey 1 each subjected to the pre-polarization rotation processing from the outputs of the above-mentioned complex adders 52e and 52f.

Further, the DA conversion part 61 includes four DA converters 61a to 61d which respectively convert the xI component, the xQ component, the yI component, and the yQ component outputted from the non-linear pre-equalization parts 53x and 53y as the results of the non-linear pre-equalization processing from digital signals to analog signals. It is also possible to amplify outputs from the DA converters 61a to 61d respectively in amplifiers 64a to 64d to convert the outputs to drive voltage signals to the light modulator 63.

The light modulator 63 has an optical modulator 63x for modulating the x polarization component, an optical modulator 63y for modulating the y polarization component, and a polarization beam combiner (PBC) 63a for combining the output lights from the optical modulators 63x and 63y with the polarization components orthogonal to each other.

In the optical modulator 63x, branched light from continuous light from the LD 62 is modulated using the drive voltage signals in correspondence to the data items xI and xQ from the DA converters 61a and 61b. In the optical modulator 63y, the branched light from the continuous light from the LD 62 is modulated using the drive voltage signals in correspondence to the data items yI and yQ from the DA converters 61c and 61d. Subsequently, the PBC 63a combines the modulated lights outputted from the above-mentioned optical modulators 63x and 63y with the polarization components orthogonal to each other. The light after the polarization combination outputted from the PBC 63a is transmitted through the transmission path 4.

The optical modulators 63x and 63y perform the optical modulations independent of each other with respect to the respective orthogonal polarization components to allow the modulation part 6 to function as the polarization multiplexing modulation part. In this case, the digital signal processing part 5 performs the digital signal processing which imparts polarization control to the signal light after the modulation with respect to the input signal for modulation for each polarization component to the polarization multiplexing modulation part 6.

The optical receiver 3 illustrated in FIG. 1 may include a conversion part 7, a digital signal processing part (reception-side digital signal processing part) 8, and a data reproduction part (data reproducer) 9. The conversion part 7 converts the signal light from the optical transmitter 2 inputted via the transmission path 4 to a digital electric signal for each polarization component. The conversion part 7 includes a detection part 71, an opto-electric (OE) conversion part 72, and an analog/digital (AD) conversion part 73.

The detection part 71 performs detection with respect to each polarization component of the signal light inputted from the transmission path 4 by using local oscillation light. As the detection method, various methods such as homodyne detection, heterodyne detection, and intradyne detection may be applied. The opto-electric conversion part 72 converts light for each polarization component outputted from the detection part 71 to the electric signal. The analog/digital conversion part 73 converts the electric signal from the opto-electric conversion part 72 to the digital signal, and outputs the digital signal to the digital signal processing part 8.

Figure 3:
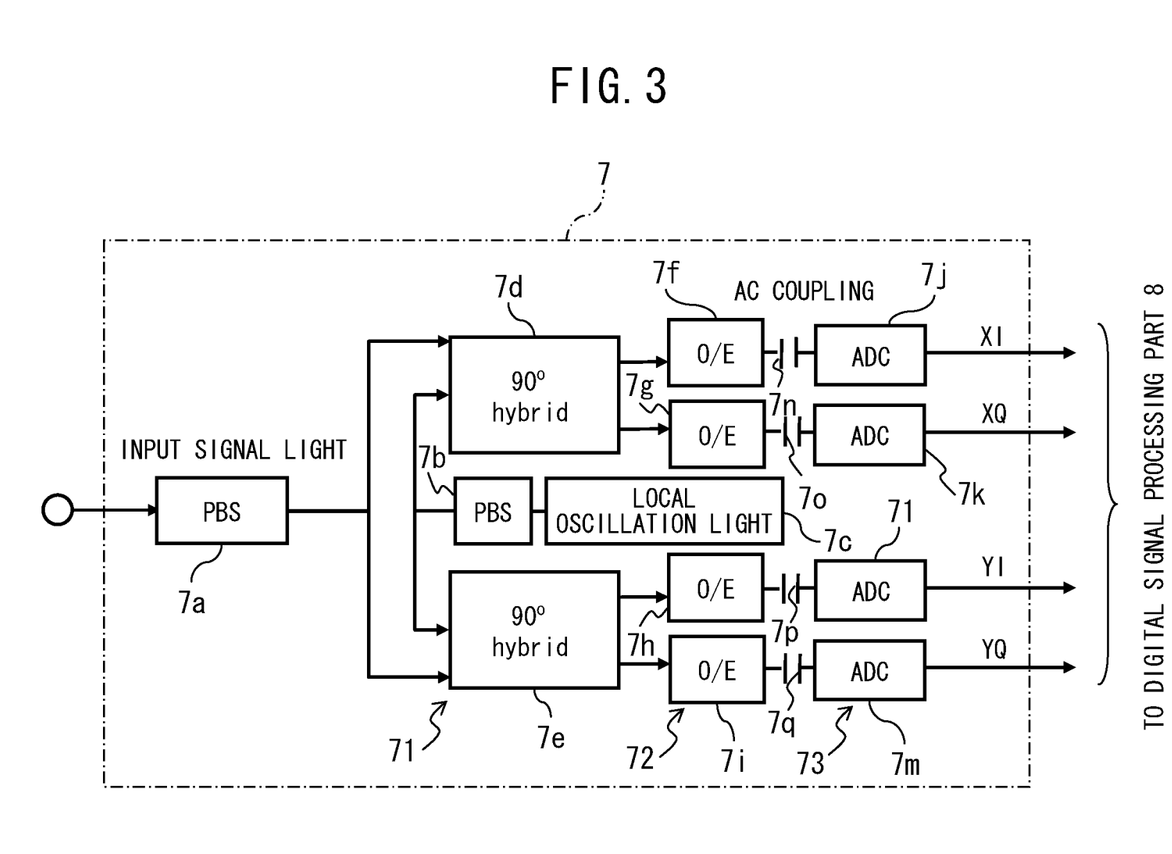
FIG. 3 is a view illustrating an example of a conversion part.

FIG. 3 is a view illustrating an example of the conversion part 7 described above. It is to be noted that the structure similar to the conversion part 7 illustrated in FIG. 3 is also described in the above-mentioned Non-Patent Documents 1 and 2. As illustrated in FIG. 3, the detection part 71 of the conversion part 7 includes polarization beam splitters (PBS) 7a and 7b, a local oscillation light source 7c, and 90-degree hybrids 7d and 7e. The PBS 7a receives the signal light from the optical transmitter 2 inputted via the transmission path 4, separates the signal light into the orthogonal polarization components, and guides one component to the 90-degree hybrid 7d and the other to the 90-degree hybrid 7e.

The local oscillation light source 7c is a light source outputting the local oscillation light used for light detection in the 90-degree hybrids 7d and 7e. A DFB (Distributed Feedback) laser may be applied as an example of the local oscillation light source 7c. The PBS 7b separates the local oscillation light from the local oscillation light source 7c into two polarization components orthogonal to each other, and respectively guides the polarization components in correspondence to the ones guided by the PBS 7a to the 90-degree hybrids 7d and 7e.

The 90-degree hybrids 7d and 7e perform the detection with respect to the respective polarization components from the transmission path 4 using the local oscillation light, and output the components as I-component detected light and Q-component detected light. That is, the 90-degree hybrid 7d outputs one of the orthogonal polarization components (e.g., the X component) as the I-component detected light and the Q-component detected light. Similarly, the 90-degree hybrid 7e outputs the other polarization component (e.g., the Y component) as the I-component detected light and the Q-component detected light.

The opto-electric conversion part 72 has OE converters 7f to 7i which perform opto-electric conversion with respect to the light of each of two polarization components each including the I component and the Q component. The OE converters 7f and 7g respectively convert the I-component detected light and the Q-component detected light from the 90-degree hybrid 7d to the electric signals. Similarly, the OE converters 7h and 7i respectively convert the I-component detected light and the Q-component detected light from the 90-degree hybrid 7e to the electric signals.

Further, the analog/digital conversion part 73 includes AD converters 7j to 7m which respectively convert the electric signals (analog signals) from the OE converters 7f to 7i to the digital signals. The OE converters 7f to 7i and the AD converters 7j to 7m may be respectively AC-coupled to each other via AC coupling devices 7n to 7q such as a capacitor and the like.

In addition, the digital signal processing part 8 of the optical receiver 3 illustrated in FIG. 1 receives the digital signals in correspondence to the detection outputs (the I component and the Q component) of each of the orthogonal polarization components of the light inputted from the transmission path 4, and performs the digital signal processing. Specifically, the data items modulated for each of the polarization components in the light modulator 63 of the optical transmitter 2 are separated by using the input digital signals. It is to be noted that the digital signal processing part 8 may be implemented by, e.g., a digital signal processor, a field programmable gate array, and an application specific integrated circuit.

The data reproduction part 9 reproduces the data item modulated in the optical transmitter 2 from the reception digital signal obtained by the reception-side digital signal processing part 8.

The digital signal processing part 8 includes an adaptive slow polarization separation part 81, a pre-polarization rotation compensation part 82, and a coefficient control part 83.

The adaptive slow polarization separation part 81 performs the digital signal processing with respect to the above-described input digital signal (reception signal) with the control by the coefficient control part 83, and adaptively estimates and reduces the influence by the polarization and intersymbol interference included in the reception signal to estimate a transmission signal sequence. Specifically, when a transmission path matrix C indicative of transmission properties of the transmission path 4 is given by an expression (3), the properties are estimated (C'), and conversion processing of the reception signal is performed by using a matrix for the reception signal conversion C'−1 derived so as to achieve inverse properties of the estimated transmission path properties C'. In the expression (3), $T_\theta$ is a matrix representing polarization rotation on the transmission path, and is given by, e.g., an expression (4). Tε is a matrix representing a deviation in a phase direction between the X and Y polarizations, and is given by, e.g., an expression (5).

$$C = \prod_m T_\theta^{(m)} T_\varepsilon^{(m)} \qquad (3)$$

$$T_\theta \equiv \begin{pmatrix} \cos\theta & -\sin\theta \\ \sin\theta & \cos\theta \end{pmatrix} \qquad (4)$$

$$T_\varepsilon \equiv \begin{pmatrix} \exp(i\frac{\varepsilon}{2}) & 0 \\ 0 & \exp(-i\frac{\varepsilon}{2}) \end{pmatrix} \qquad (5)$$

The coefficient control part 83 estimates coefficients of the matrix C' mentioned above. Various criteria may be applied as the criterion for the coefficient control in the coefficient control part 83. For example, a constant modulus algorithm (CMA), a minimum mean square error (MMSE), a maximum signal-to-noise ratio, and a least mean square (LMS) may be applied.

The CMA is an equalization criterion utilizing constant-envelope properties of the transmission signal. The MMSE is an equalization criterion utilizing a replica of the transmission signal. The maximum signal-to-noise ratio is an equalization criterion utilizing the maximum signal-to-noise power ratio (SN ratio). The LMS is an equalization criterion utilizing successive approximation. In other words, the adaptive slow polarization separation part 81 and the coefficient control part 83 are examples of an adaptive polarization control part performing polarization control in accordance with the properties of the transmission path 4 with respect to the digital electric signal from the conversion part 7.

As the adaptive slow polarization separation part 81 and the coefficient control part 83, the technologies described in Patent Documents 1 and 2 mentioned above may also be applied.

The pre-polarization rotation compensation part 82 is an example of a reception-side signal processing part performing the digital signal processing which imparts a polarization change having properties substantially inverse to those of the polarization control in the transmission-side signal processing part 5 with respect to the digital electric signal from the conversion part 7. The pre-polarization rotation compensation part 82 illustrated in FIG. 3 performs the digital signal processing imparting the above-described polarization control with respect to the digital electric signal subjected to the polarization control in the adaptive slow polarization separation part 81, and outputs the result to the data reproducer 9.

In other words, the transmission-side digital signal processing part 5 of the optical transmitter 2 performs the digital signal processing which imparts the polarization scrambling to the signal light after the modulation in the modulation part 6 with respect to the input signal (signal derived from the input signal). On the other hand, the pre-polarization rotation compensation part 82 performs the digital signal processing which imparts the polarization scrambling having properties substantially inverse to those of the polarization scrambling in the transmission-side digital signal processing part 5 with respect to the digital electric signal from the conversion part 7.

Specifically, when the polarization scrambling using the angular velocity ωT is performed as indicated by the above-described expression (1) in the transmission-side digital signal processing part 5, the pre-polarization rotation compensation part 82 performs the polarization control which compensates for the polarization scrambling by the above-described expression (1). That is, in the pre-polarization rotation compensation part 82, the digital signal processing using an inverse matrix R−1 inverse to the matrix R given by the expression (2). The above-described R−1 is represented by an expression (6). In an expression (8), (ωR represents an angular velocity compensating for ωT used for the pre-polarization rotation.

$$R^{-1} = \begin{pmatrix} b_{11} & b_{12} \\ b_{21} & b_{22} \end{pmatrix} = \begin{pmatrix} \cos(\omega_R t) & -\sin(\omega_R t) \\ \sin(\omega_R t) & \cos(\omega_R t) \end{pmatrix} \quad (6)$$

When the angular velocity ωT for the polarization scrambling in the transmission-side digital signal processing part 5 is known, the pre-polarization rotation compensation part 82 performs the polarization scrambling processing having an equal angular velocity in the opposite direction (ωR=−ωT). On the other hand, when the angular velocity ωT for the polarization scrambling on the transmission side is not known, the pre-polarization rotation compensation part 82 may select, from among predetermined angular velocities, the one providing the reception data with excellent quality that is generated in the data reproducer 9 in the subsequent stage with the control in a startup-time control part 84 described below.

When it is assumed herein that the data items (input signals) for the respective polarization components to the optical transmitter 2 are (Ex, Ey), the input signals may be represented as (EX, EY) indicated in an expression (7) in a stage where the input signals are inputted to the optical receiver 3 as the reception signals. That is, the input signals are influenced by the polarization scrambling in the digital signal processing part 5 and the transmission path properties of the transmission path 4. In contrast to this, as indicated by an expression (8), it is possible to obtain signals subjected to polarization separation (Ex', Ey') by performing the processing in the adaptive slow polarization separation part 81 and the pre-polarization rotation compensation part 82 with respect to the reception signals mentioned above.

$$\begin{pmatrix} EX \\ EY \end{pmatrix} = CR\begin{pmatrix} Ex \\ Ey \end{pmatrix} \quad (7)$$

$$\begin{pmatrix} Ex' \\ Ey' \end{pmatrix} = R^{-1}C'^{-1}CR\begin{pmatrix} Ex \\ Ey \end{pmatrix} \quad (8)$$

Figure 4:
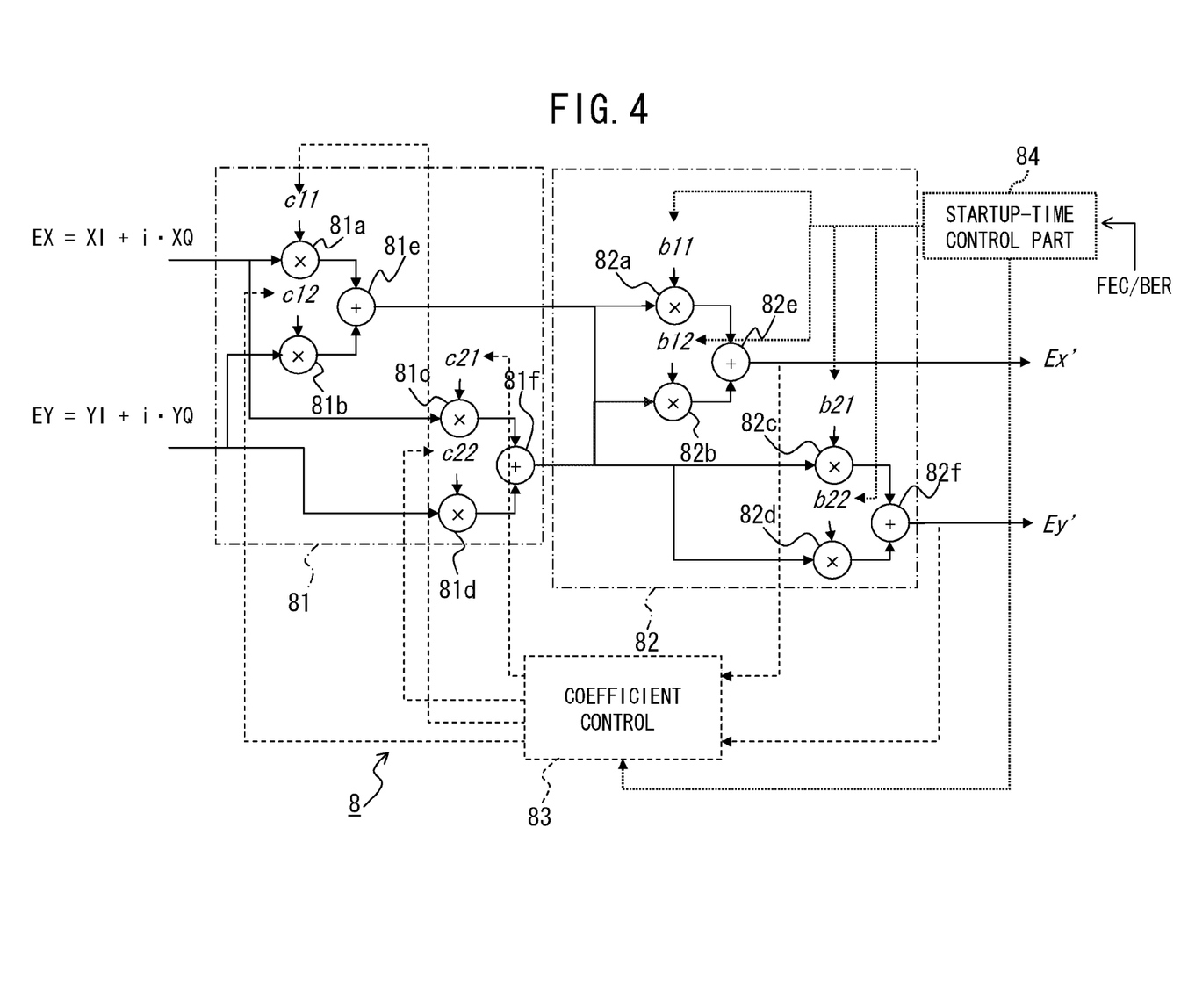
FIG. 4 is a view illustrating an example of a reception-side digital signal processing part.

FIG. 4 is a view illustrating an example of the digital signal processing part 8 described above. The adaptive slow polarization separation part 81 may include complex multipliers 81a to 81d and complex adders 81e and 81f. The complex multipliers 81a and 81c multiply the input digital electric signal EX (=XI+i·XQ) by coefficients c11 and c21 The coefficients c11 and c21 are controlled so as to have the matrix C'−1 having the properties inverse to those of the matrix C' in which the transmission path matrix is estimated. Similarly, the complex multipliers 81b and 81d multiply the input digital electric signal EY (=YI+i·YQ) by coefficients c12 and c22 of the matrix C'−1 having the properties inverse to those of the matrix C' in which the transmission path properties are estimated. The complex adders 81e and 81f respectively add the multiplication results of the complex multipliers 81a and 81b and the multiplication results of the complex multipliers 81c and 81d. The above-mentioned coefficients c11, c12, c21, and c22 are controlled by the coefficient control part 83.

Further, the pre-polarization rotation compensation part 82 may also include complex multipliers 82a to 82d and complex adders 82e and 82f as illustrated in FIG. 4. The complex multipliers 82a and 82c respectively multiply the outputs of the complex adder 81e in the adaptive slow polarization separation part 81 by coefficients b11 and b21 controlled so as to have the inverse matrix R-1 to the matrix R for the polarization scrambling. Similarly, the complex multipliers 82b and 82d respectively multiply the outputs of the complex adder 81f by coefficients b12 and b22 controlled so as to have the inverse matrix R−1 to the matrix R for the polarization scrambling.

The complex adders 82e and 82f respectively add the multiplication results of the complex multipliers 82a and 82b and the multiplication results of the complex multipliers 82c and 82d. With the output of the complex adder 82e, the data item Ex' modulated with one of the polarization components (e.g., the x component) in the optical transmitter 2 may be demodulated. In addition, with the output of the complex adder 82f, the data item Ey' modulated with the other polarization component (e.g., the y component) in the optical transmitter 2 may be demodulated.

Figure 5:
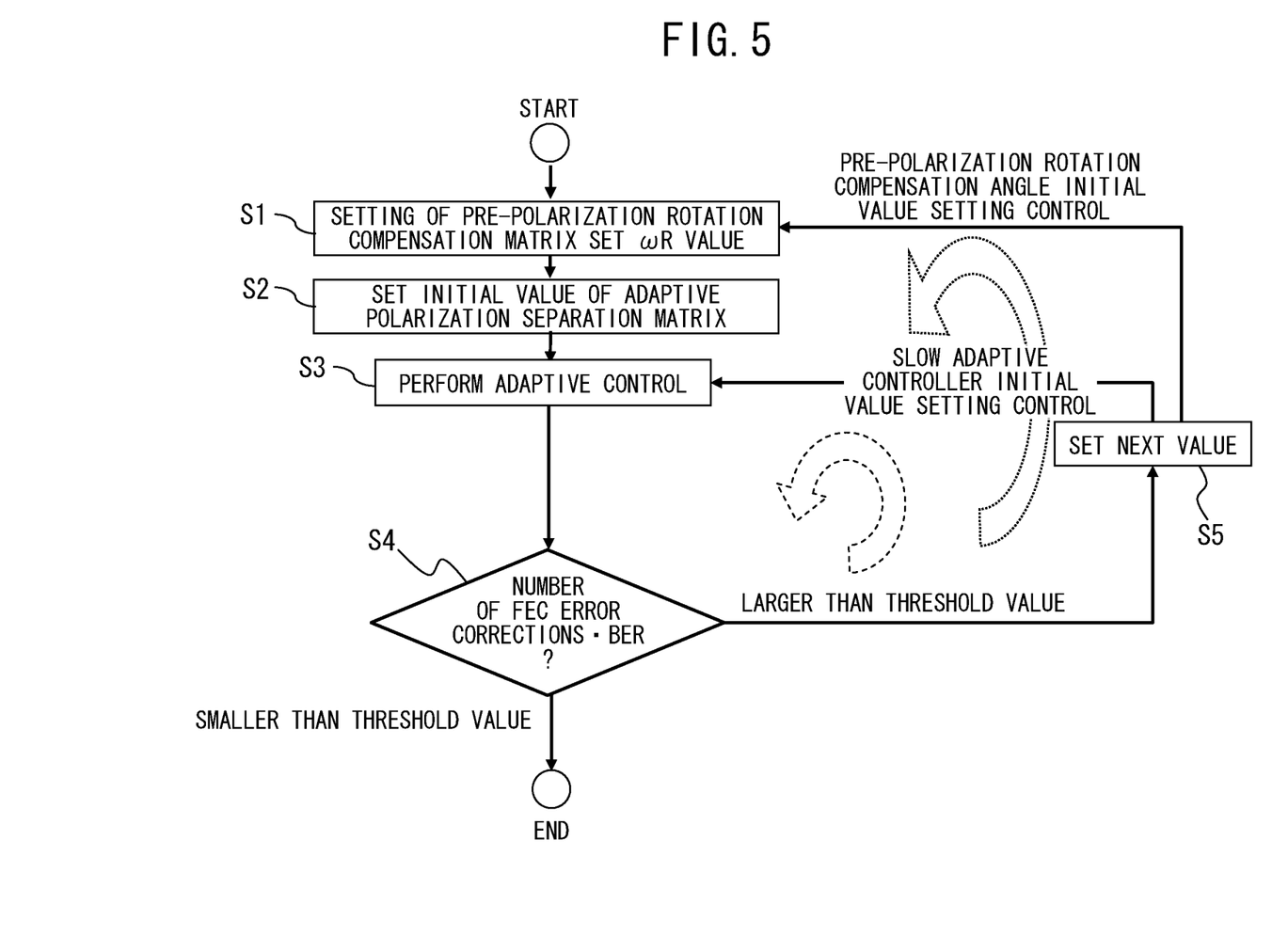
FIG. 5 is a flow chart for illustrating an operation of a startup-time control part.

Further, the digital signal processing part 8 may include the startup-time control part 84 which sets and controls the coefficients b11, b12, b21, and b22 each used for the signal conversion in the adaptive slow polarization separation part 81 and the pre-polarization rotation compensation part 82 when the optical receiver 3 is started. FIG. 5 is a flow chart illustrating an example of the operation in the startup-time control part 84.

That is, when the angular velocity ωT for the polarization scrambling on the transmission side is not known, from among R−1s in correspondence to a plurality of predetermined ωRs, one ωR is set (operation 51). Then, the coefficients b11, b12, b21, and b22 defining R−1 on the basis of the set ωR are set respectively in the complex multipliers 82a to 82d (operation S2).

When the coefficients of R−1 in the pre-polarization rotation compensation part 82 are set in this manner, with regard to the coefficients c11, c12, c13, and c14 each for the signal conversion in the adaptive slow polarization separation part 81, any one selected from a plurality of setting combinations of the coefficients is set through the coefficient control part 83. The digital signal processing part 8 outputs the signals as the result of the digital signal processing performed on the basis of the coefficient setting described above to the data reproducer 9 (operation S3). Subsequently, the startup-time control part 84 receives information related to reception signal quality when data reproduction has been performed with respect to the signal subjected to the above-described processing in the digital signal processing part 8 in the data reproducer 9 in the subsequent stage. The information related to the reception signal quality which the startup-time control part 84 receives may include, e.g., the number of times a forward error correction (FEC) is performed and a value of bit error rate (BER).

In the startup-time control part 84, the setting of the angular velocity ωR in the pre-polarization rotation compensation part 82 is sequentially changed until the reception signal quality becomes smaller than a given threshold value (the route with "SMALLER THAN THRESHOLD VALUE" in operation S4), and the coefficient setting for the signal conversion in the adaptive slow polarization separation part 81 is sequentially changed (from the route with "LARGER THAN THRESHLD VALUE" in operation S4 to operation S5).

In the startup-time control part 84, when the initial value setting described above is completed, the coefficient setting in the pre-polarization rotation compensation part 82 is thereafter fixed, and the operation flow may proceed to the above-described control to which various criteria are applied in the coefficient control part 83.

In the optical transmission/reception system 1 thus structured, the digital signal processing which imparts the polarization control to the signal light after the modulation is performed with respect to the input signal in the digital signal processing part 5 of the optical transmitter 2, the input signal subjected to the digital signal processing is modulated to be the signal light in the modulation part 6, and the modulated signal light is transmitted.

On the other hand, in the conversion part 7 of the optical receiver 2, the signal light received via the transmission path 4 is converted to the digital electric signal, and the digital signal processing which imparts the polarization control having properties substantially inverse to those of the polarization control in the optical receiver 2 is performed with respect to the converted digital electric signal in the pre-polarization rotation compensation part 82 of the digital signal processing part 8.

With this arrangement, since the polarization scrambling processing is implemented by the digital signal processing, high-speed polarization scrambling processing may be performed. Therefore, it is possible to suppress the influence exerted on the reception signal quality by the polarization properties of the transmission path which fluctuate with time.

In addition, it is possible to cancel out the polarization scrambling performed in the transmission-side digital signal processing part 5 in the pre-polarization rotation compensation part 82 of the reception-side digital signal processing part 8. With this arrangement, when signals with two data sequences independent of each other are polarization-multiplexed in the optical transmitter 2, it is possible to accurately perform the polarization separation of reception signals. Further, even when the speed of the polarization scrambling on the transmission side is increased, it is possible to easily perform the polarization separation with the addition of the digital signal processing algorithm on the reception side.

Figure 7:
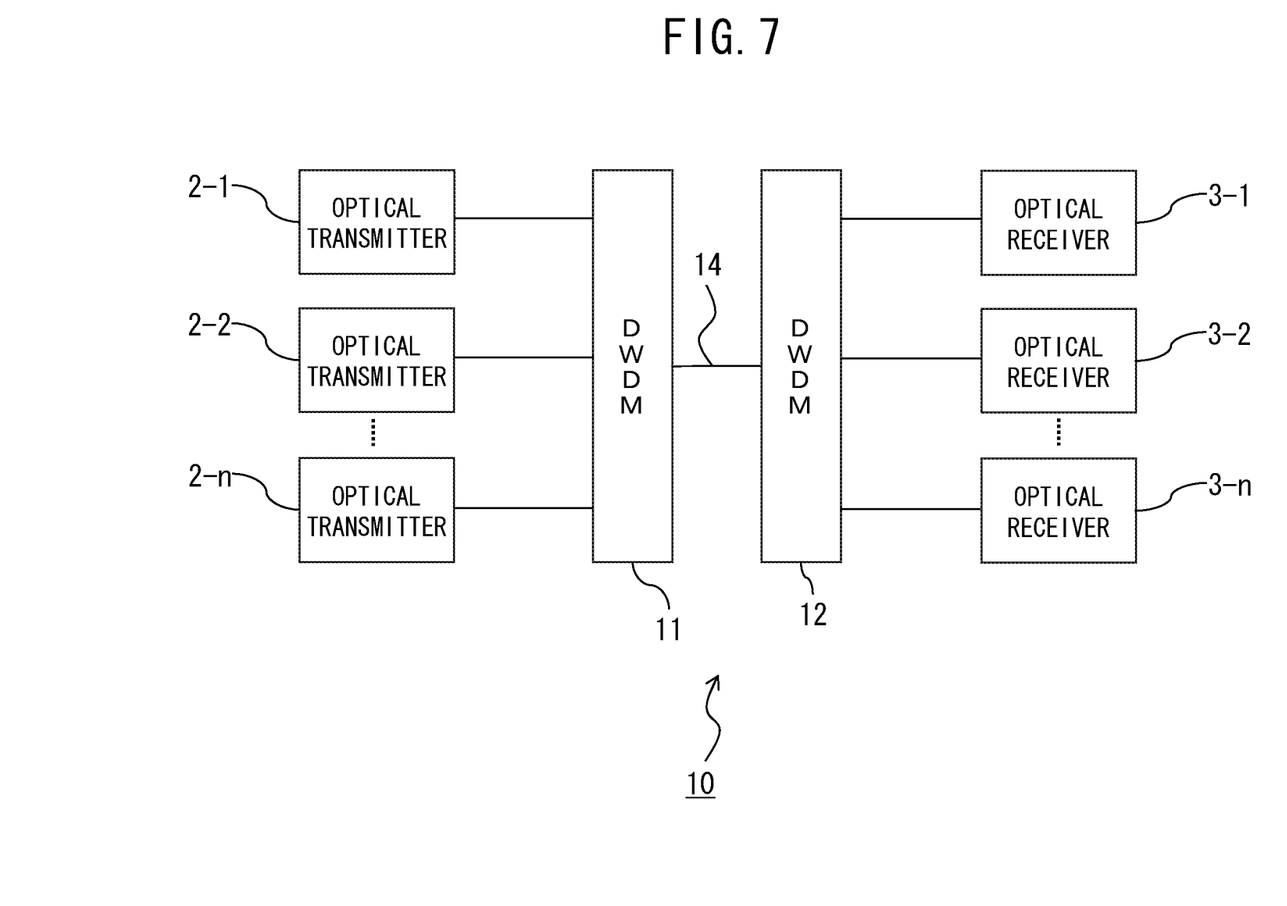
FIG. 7 is a view illustrating a DWDM system.

Further, when it is assumed that the optical transmission/reception system 1 is applied to a DWDM system 10 illustrated in FIG. 7, since it becomes possible to switch on/off of the polarization scrambling with the digital signal processing during the optical modulation for each wavelength, the polarization scrambling may appropriately be performed in accordance with channels. The DWDM system 10 illustrated in FIG. 7 includes optical transmitters 2-1 to 2-n and optical receivers 3-1 to 3-n with n (n is an integer of 3 or more) channels, and a wavelength multiplexer 11 which wavelength-multiplexes the signal light from each of the optical transmitters 2-1 to 2-n and a wavelength separator 12 which wavelength-separates the signal light to each of the optical receivers 3-1 to 3-n. The reference numeral 14 denotes a wavelength multiplex transmission path between the wavelength multiplexer 11 and the wavelength separator 12.

In comparison with a device which performs optical polarization scrambling, since the polarization scrambling may be implemented by adding the algorithm to the existing digital signal processing part, it is possible to suppress increases in device size and cost.

Figure 6:
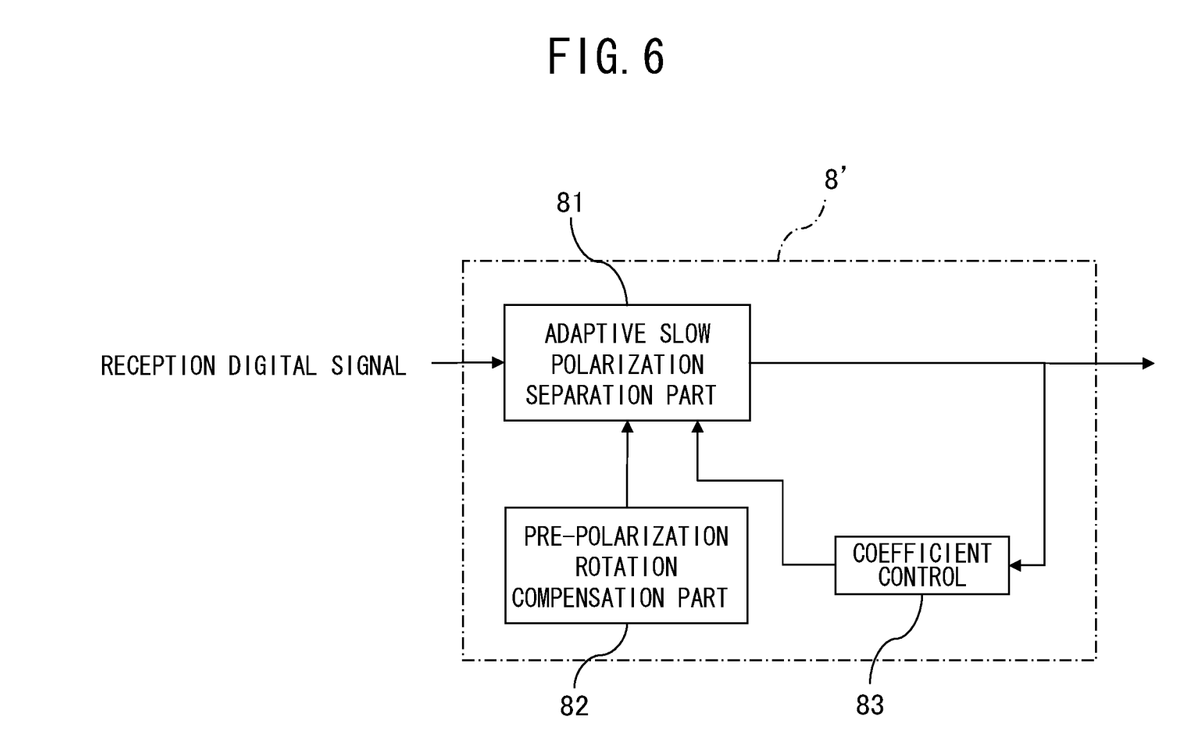
FIG. 6 is a view illustrating a modification of the reception-side digital signal processing part.

In the digital signal processing part 8, in addition to the above-described aspect in which the signal conversion in the adaptive slow polarization separation part 81 and in the pre-polarization rotation compensation part 82 is sequentially performed as illustrated in FIG. 2, the signal conversion may also be performed according to, e.g., an aspect in a digital signal processing part 8' illustrated in FIG. 6. In the digital signal processing part 8' illustrated in FIG. 6, the signal conversion R−1C'31 1 obtained by preliminarily adding the signal conversion in the pre-polarization rotation compensation part 82 and the signal conversion in the adaptive slow polarization separation part 81 is performed with respect to the reception digital signal from the conversion part 7.

Effect of the Invention

According to the disclosed technology, it is possible to suppress the influence exerted on the reception signal quality by polarization-dependent properties of the transmission path which fluctuate with time.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical transmission/reception system comprising:
a modulator configured to modulate light based on data to output signal light;
a transmission-side signal processing unit configured to output the data using an input signal to impart polarization rotation of the signal light, the modulator imparting a polarization rotation to the signal light by the optical modulation in accordance with the output data;
an optical transmitter configured to transmit the signal light modulated by the modulator; and
an optical receiver including a converter converting the signal light input from the optical transmitter via a transmission path to a digital electric signal for each polarization component, and a reception-side signal processor unit configured to impart a change to the digital electric signal from the converter having a property substantially inverse to a property of the polarization rotation of the signal light in the transmission-side signal processor unit, wherein
the transmission-side signal processing unit includes that complex multipliers correspondingly multiply first polarization components and second polarization components of the input signal by first cos ωt and sin ωt and second cos ωt and sin ωt, and complex adders correspondingly add a first set of different polarization components output from the complex multipliers and add a second stet of different polarization components output from the complex multipliers to output the data.

2. The optical transmission/reception system of claim 1, wherein the modulator is a polarization multiplexing modulator performing the optical modulations independent of each other with respect to respective polarization components orthogonal to each other, and the transmission-side signal processing unit performs processing on the data which imparts the polarization rotation to the signal light for each of the polarization components.

3. The optical transmission/reception system of claim 1, wherein the transmission-side digital signal processing in the transmission-side signal processing unit comprises processing of the data which imparts polarization rotation to the signal light, and processing which imparts polarization rotation having a property substantially inverse to a property of the polarization rotation in the transmission-side digital signal processing unit is performed with respect to the digital electric signal as the reception-side digital signal processing in the reception-side signal processing unit.

4. The optical transmission/reception system of claim 1, wherein the optical receiver includes an adaptive polarization control part performing polarization control in accordance with a property of the transmission path with respect to the digital electric signal from the converter, and the reception-side signal processing unit performs the reception-side digital signal processing with respect to the digital electric signal subjected to the polarization control in the adaptive polarization control part.

5. The optical transmission/reception system of claim 1, wherein the reception-side signal processing unit concurrently performs the polarization control in accordance with the property of the transmission path with respect to the digital electric signal in the digital signal processing.

6. The optical transmission/reception system of claim 1, wherein the converter includes a detection part performing detection for each polarization component with respect to the input signal light using local oscillation light, an opto-electric converter converting an output from the detection part to an electric signal, and an analog/digital converter converting the electric signal from the opto-electric converter to a digital signal.

7. The optical transmission/reception system of claim 1, wherein the reception-side signal processing unit is a digital signal processing unit.

8. An optical transmitter in the optical transmission/reception system of claim 1.

9. An optical receiver in the optical transmission/reception system of claim 1.

10. The optical transmission/reception system of claim 1, wherein the modulator is a polarization multiplexing modulator performing the optical modulations independent of each other by modulating a phase of respective polarization components, and the transmission-side signal processing unit performs processing on the data which imparts the phase modulation to the signal light for each of the polarization components.

11. An optical transmission/reception method, comprising:
imparting a polarization rotation to signal light by optical modulation with respect to data, correspondingly multiplying first polarization components and second polarization components of an input signal by first cos ωt and sin ωt and second cos ωt and sin ωt, and correspondingly adding a first set of different polarization components output from the complex multipliers and adding a second set of different polarization components output from the complex multipliers to output the data;
performing the optical modulation based on the data;
transmitting the signal light subjected to the optical modulation;
converting the signal light received via a transmission path to a digital electric signal in an optical receiver; and
performing digital signal processing which imparts a change to the digital electric signal having a property substantially inverse to a property of the data in an optical transmitter.

12. An optical transmission/reception system comprising:
a modulator that modulates light based on data to output signal light;
a transmission-side signal processing unit that includes complex multipliers and complex adders and that processes an input signal using the complex multipliers and the complex adders for polarization rotation, the modulator imparting a polarization rotation to the output signal light by optical modulation with respect to the data;
an optical transmitter in which the modulator performs the optical modulation based on the data subjected to the transmission-side signal processing unit; and
an optical receiver that includes a converter converting the signal light input from the optical transmitter via a transmission path to a digital electric signal for each polarization component, and a reception-side signal unit performing reception-side digital signal processing which imparts a change to the digital electric signal from the converter having a property substantially inverse to a property of the data in the transmission-side signal processing unit, wherein
the transmission-side signal processing unit includes that the complex multipliers multiply first polarization components and second polarization components of the input signal by first cos ωt and sin ωt and second cos ωt and sin ωt, and the complex adders correspondingly add a first set of different polarization components output from the complex multipliers and add a second set of different polarization components output from the complex multipliers to output the data.

* * * * *

UNITED STATES PATENT AND TRADEMARK OFFICE
CERTIFICATE OF CORRECTION

PATENT NO. : 8,942,569 B2  
APPLICATION NO. : 12/581413  
DATED : January 27, 2015  
INVENTOR(S) : Takahito Tanimura et al.

Page 1 of 1

It is certified that error appears in the above-identified patent and that said Letters Patent is hereby corrected as shown below:

In the Claims

Column 13, Line 8, In Claim 1, delete "by the" and insert -- by --, therefor.
Column 13, Line 15-16, In Claim 1, delete "processor" and insert -- processing --, therefor.
Column 13, Line 18, In Claim 1, delete "property of the" and insert -- property of the signal for --, therefor.
Column 13, Line 20, In Claim 1, delete "processor" and insert -- processing --, therefor.
Column 13, Line 28, In Claim 1, delete "stet" and insert -- set --, therefor.

Signed and Sealed this
Twelfth Day of May, 2015

Michelle K. Lee
*Director of the United States Patent and Trademark Office*